Feb. 11, 1941.  C. G. GERHOLD  2,231,444
SEPARATION OF LOW BOILING COMPONENTS FROM
A WIDE BOILING RANGE MIXTURE
Filed Sept. 30, 1938  3 Sheets-Sheet 2

FIG. 2

INVENTOR
CLARENCE G. GERHOLD
BY *Lee J Gary*
ATTORNEY

Patented Feb. 11, 1941

2,231,444

UNITED STATES PATENT OFFICE 2,231,444

SEPARATION OF LOW BOILING COMPONENTS FROM A WIDE BOILING RANGE MIXTURE

Clarence G. Gerhold, Chicago, Ill., assignor to Universal Oil Products Company, Chicago, Ill., a corporation of Delaware Application September 30, 1938, Serial No. 232,569

10 Claims. (Cl. 196—11)

The invention is particularly directed to a method and means of utilizing a heating medium of lower temperature than that which can ordinarily be employed in conventional practice for reboiling liquids of relatively wide boiling range to liberate excess quantities of undesirable low-boiling fractions therefrom. The features of the invention are particularly applicable to several well known steps in modern oil refining practice, such as for example, fractionating and stabilizing operations, as well as certain types of distilling operations wherein it is desirable to strip or reboil the heavy residue or bottoms.

To demonstrate the principle which is utilized to advantage in the present invention: It is well known that the initial boiling point of a mixture of hydrocarbon oil fractions is appreciably higher than the boiling point of the lightest fractions of the mixture due to the fact that the vapor pressure of the light components is suppressed by the heavier components of the mixture. For example, although the boiling point of butane is approximately 33° F., a gasoline containing 12% of butane and having a vapor pressure of approximately 14.7 pounds Reid, must be heated to a temperature of 100° F. before any appreciable vaporization occurs and a considerably higher temperature is required to distill any substantial amount of the gasoline. In the present invention this differential in temperature between the normal boiling point of the low-boiling components of a liquid mixture recovered from a zone of relatively high pressure and the temperature at which a substantial quantity of said low-boiling components can be separated therefrom by distillation, is advantageously employed to permit the use of a lower temperature heating medium for reboiling the mixture, than that which would give satisfactory results in conventional practice. This is accomplished by a series of cooperative steps which comprise removing the mixture to be reboiled from a zone of relatively high pressure wherein it exists in heated state but in substantial equilibrium with vaporous materials therein and supplying the same to a zone of substantially reduced pressure whereby a substantial quantity of its low-boiling components are vaporized by flash distillation with a corresponding absorption of latent heat, recovering the unvaporized components of the mixture from said reduced pressure zone as the reboiled product, condensing vaporous products evolved in said reduced pressure zone by passing the same in indirect heat exchange with a suitable cooling medium, passing resulting condensate in indirect heat exchange with a suitable heating medium (which is at a lower temperature level than that required for direct reboiling of the mixture in said higher pressure zone) whereby the condensate is revaporized and introducing resulting revaporized condensate into the body of said liquid mixture in the high pressure zone whereby to supply additional heat thereto for reboiling.

It will be apparent from the foregoing that the process involves two vaporization steps, the first of which is accomplished at substantially reduced pressure relative to that employed in the fractionating, stabilizing or other high pressure zone from which the liquid mixture to be reboiled is obtained, while the second vaporization step which follows condensation of the vapors evolved in the first step is accomplished at a pressure substantially the same as that employed in said high pressure zone, but in the absence of the higher boiling components of the mixture. However, this apparently inefficient method of producing a given quantity of vapors is more than compensated for by the fact that in each of the two vaporization steps the temperature level of the latent heat required to effect vaporization is considerably less than that which would be required for direct reboiling of the mixture and consequently a lower temperature heating medium may be employed.

It should be further noted in the present invention the temperature to which the mixture is heated prior to its removal from the high pressure zone is not limited by the temperature of the heating medium, since, by introducing the reheated condensate in vaporous state into said mixture a part of the vapor is absorbed by the liquid and the resultant heat of absorption increases the temperature of the latter.

The principle involved is very much the same as that employed in a refrigerating cycle, in that heat is absorbed at a low temperature level and is liberated at a higher temperature level. However, the application of this principle is entirely different from that encountered in refrigeration and the temperatures employed are of a different order.

Obviously the purpose of the condensation step in the process above described is to permit return of the volatile fractions evolved in the reduced pressure zone to the high pressure zone with an ordinary pump suitable for handling the condensate. It is, of course, entirely within the scope of the invention to employ a suitable vapor pump or compressor for returning the evolved volatile materials to the higher pressure zone, thereby eliminating the use of a cooling medium for their condensation. However, this is not the preferred method of operation, since the additional expense involved in pumping the vapors is ordinarily greater than the cost of the heat wasted by condensing the same. Use of the cooling and condensation step has a further advantage of permitting removal from the condensate accumulator of any undesired excessively low-boiling fractions which by the other method would be returned to the high pressure zone and commingled therein with the material undergoing reboiling.

The following are some of the advantages offered by the invention as compared with conventional reboiling methods:

(1) As compared with direct reboiling (i. e., passing a heat carrying medium in indirect heat exchange with the mixture to be reboiled):

(a) A lower temperature heating medium which is usually more readily available than the high temperature medium required for direct reboiling may be employed. This low temperature heating medium may comprise exhaust steam, for example, which is usually available in large quantities in a modern refinery and a large portion of which is frequently wasted.

(b) The process avoids the use of high temperatures, the highest temperature encountered being that of the liquid undergoing reboiling in the high pressure zone and being substantially lower than the temperature required for reboiling a liquid by passing the heating medium in indirect heat exchange therewith. Furthermore, direct introduction of the reheated and revaporized condensate into the body of liquid undergoing reboiling eliminates the use in this zone of a closed coil or other fluid conduit through which a high temperature heating medium is passed is one of the most widely used conventional methods of reboiling, thereby obviating localized high temperatures such as the steam temperatures of such a fluid conduit. This is a distinct advantage when the products to be reboiled comprise materials which are damaged or converted into undesirable gum and color forming compounds, for example by excessive heating as well as when the product to be reboiled contains materials which tend to collect on and foul the surface of the fluid conduit.

(2) As compared with reboiling by the direct introduction of steam into the mixture to be reboiled, the required size of the fractionating, stabilizing or other high pressure zone is materially reduced, since the reboiled and revaporized condensate is a component of the material initially supplied to this zone, rather than additional material from an external source.

(c) The necessity for a source of high pressure steam is eliminated.

(d) The problem of separating steam from the vaporous or gaseous products removed from the high pressure zone is eliminated and in operations wherein it is desired to subsequently condense fractions evolved in the high pressure zone a much smaller condenser surface and a much smaller amount of cooling medium is required, since there is no steam to be condensed.

(e) The use of a higher vapor outlet temperature from a high pressure zone is permissible. This makes the invention applicable to the stabilization of gasoline for example, whereas the use of steam for distillation or reboiling in such an operation is practically impossible due to the low temperature which results from its use. In other cases a higher vapor outlet temperature improves the efficiency of the succeeding condensation step due to the higher mean temperature difference between the vapors undergoing condensation and the cooling medium.

The accompanying diagrammatic drawings comprising Figs. 1, 2 and 3 illustrate three specific adaptations of the features of the invention to various operations commonly encountered in modern oil refining practice.

Figure 1:
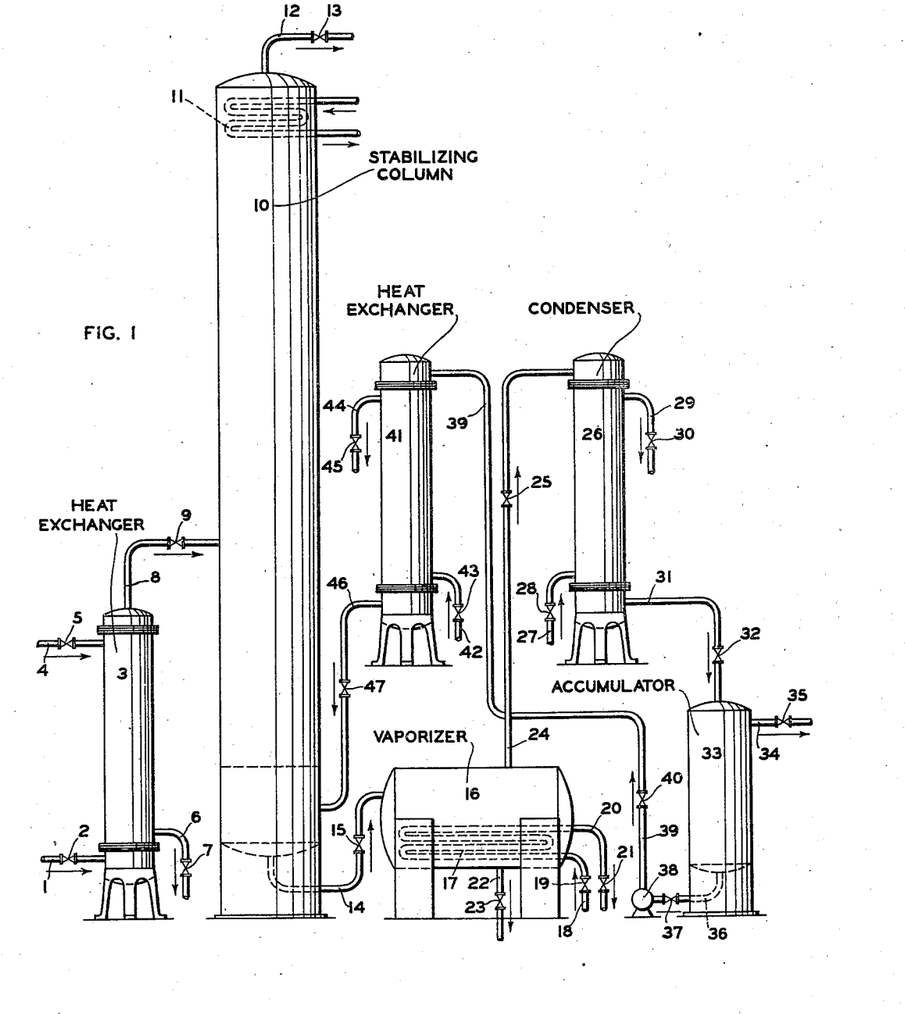
Fig. 1 illustrates an apparatus embodying the features of the invention wherein distillate such as gasoline is stabilized to the desired vapor pressure.

Referring particularly to Fig. 1, the distillate to be stabilized, comprising, for example, gasoline resulting from a cracking operation and containing a substantial quantity of normally gaseous products, such as propane, butane and the corresponding olefins, is directed through line 1 and valve 2 to heat exchanger 3 wherethrough it passes in indirect heat exchange with a suitable heating medium which is supplied to the heat exchanger through line 4 and valve 5 and discharged therefrom through line 6 and valve 7. The distillate is heated sufficiently in heat exchanger 3 to effect substantial vaporization thereof and is directed through line 8 and valve 9 into stabilizing column 10.

Column 10 preferably contains suitable fractionating means, such as bubble trays, packing or the like, not illustrated, and cooling means, such as closed coil 11, for example, through which a suitable cooling medium is circulated, is preferably employed in the upper portion of the column to provide a refluxing liquid which passes downward through the column counter-current to the ascending vapors and gases.

The low-boiling gaseous components of the distillate, preferably including a substantial portion or all of the propane, propene, as well as a portion of the butane, butene, and lower boiling gases (representing the excess quantity of normally gaseous components of the distillate over that required to give the desired vapor pressure in the final stabilized product) are removed from the upper portion of the column through line 12 and valve 13 through which they are directed to storage or elsewhere as desired.

The gases thus removed from the upper portion of the column may, when desired, be subjected to condensation and the resulting condensate returned in regulated quantities to the upper portion of the stabilizer as a cooling and refluxing medium, such condensate being either passed through a closed coil such as indicated at 11 or being introduced into direct contact with the gases in the upper portion of the column by well known means, not illustrated. It is also within the scope of the invention to subject the overhead gaseous products from stabilizer 11 to absorption, for recovery of the desired high-boiling components thereof in a liquid absorption medium. However, the treatment of the gaseous products after leaving the upper portion of column 10 is not a pertinent part of the invention and, therefore, none of the various alternative methods are illustated in the drawings.

The distillate which remains unvaporized in column 10, as well as the portions thereof which are vaporized and recondensed in this zone, collect within the lower portion of the column and in the absence of suitable reboiling means will normally contain an excess of low-boiling fractions such as propane and/or butane over that required for a stabilized product of the desired vapor pressure. The usual method of reboiling the distillate which thus collects in the lower portion of the stabilizer is to pass a suitable relatively high temperature heating medium, such as live steam, hot oil or the like, in indirect heat exchange with the distillate either within the lower portion of column 10 or in a separate vaporizing or reboiling zone to which the distillate is supplied and wherefrom the evolved vapors are returned to the stabilizer. It is also conventional practice to operate the stabilizer at a substantial superatmospheric pressure, particularly when the distillate to be stabilized is recovered from a pressure zone. In the improved process of the invention, the stabilizing column is also preferably operated at substantial superatmospheric pressure, but differs from conventional practice in that reboiling of the distillate is accomplished in the lower portion of the stabilizer without the use of a high temperature heating medium. The method and means whereby this is accomplished will now be described.

The distillate which collects in the lower portion of column 10, and which in the present case is substantially freed of any excess quantity of low-boiling fractions in this zone, is directed therefrom through line 14 and valve 15 to vaporizer 16, which may be any suitable form of vaporizing drum or chamber and which is preferably operated at a substantially reduced pressure relative to that employed in column 10. The reduction of pressure in vaporizer 16 serves to liberate latent heat from the distillate and cause vaporization of an appreciable quantity of its remaining low-boiling fractions. The quantity of vapors and/or gases thus liberated in vaporizer 16 is regulated by control of the temperature and pressure conditions employed in this zone. Since these evolved vapors and/or gases preferably are subsequently condensed, it is preferable to maintain a sufficient pressure in vaporizer 16 and on the volatile materials removed therefrom to insure their satisfactory condensation with a readily available inexpensive cooling medium, such as water at asmospheric temperature. It is, therefore, ordinarily desirable to supply some additional heat to the distillate in vaporizer 16. The amount of such additional heat required will vary somewhat depending upon heat balance in stabilizer 10 which in turn depends upon the temperature of the heated distillate entering this zone and the amount of cooling accomplished in the stabilizer. In any case, however, with the present process the amount of additional heat required in vaporizer 16 is relatively low and may be derived from a low temperature heating medium, such as condensing exhaust steam, due to the fact that the temperature of the liquid is substantially reduced by the flash distillation and heat may be added at a relatively low temperature level. Provision is made in the case here illustrated for passing a heating medium of this type through closed coil 17 immersed in the body of liquid maintained in vaporizer 16 by means of lines 18 and 20 controlled by the respective valves 19 and 21.

The stabilized and reboiled distillate is withdrawn, in the particular case here illustrated, from the lower portion of vaporizer 16 through line 22 and valve 23 to cooling and storage or elsewhere as desired, although it may, when desired, be removed from the lower portion of column 10 by well known means, not illustrated.

The materials evolved in vaporizer 16 are directed therefrom through line 24 and valve 25 to condenser 26 through which they pass in indirect heat exchange with a suitable cooling medium, such as water, supplied to the heat exchanger through line 27 and valve 28 and removed therefrom through line 29 and valve 30. A substantial quantity or all of the vapors are condensed in condenser 26 and the condensate passes, together with any remaining uncondensed materials, through line 31 and valve 32 to accumulator 33. Any uncondensed vapors and/or gases are withdrawn from accumulator 33 through line 34 and valve 35 and may, when desired, be commingled by well known means, not illustrated, with the volatile materials withdrawn from the upper portion of stabilizing column 10.

Condensate is directed from accumulator 33 through line 36 and valve 37 to pump 38, wherefrom it is supplied through line 39 and valve 40 to heat exchanger 41. A suitable relatively low temperature heating medium, such as exhaust steam, for example, is supplied to heat exchanger 41 through line 42 and valve 43 and, after passing through this zone in indirect heat exchange with the condensate supplied thereto, is removed from the heat exchanger through line 44 and valve 45. The condensate is substantially or totally vaporized in heat exchanger 41 by means of the heat recovered from the relatively low temperature heating medium and the resultant vapors are directed from heat exchanger 41 through line 46 and valve 47 into the lower portion of column 10 wherein they may be introduced directly into the body of liquid maintained in this zone or may be introduced above the level of the liquid which is allowed to accumulate in the lower portion of the stabilizer, in which latter case suitable contacting means such as bubble trays, packing or the like are preferably disposed in the lower portion of column 10 above the point of introduction of the revaporized condensate and beneath the point of introduction of the heated distillate supplied to this zone for stabilization. At least a portion of the revaporized condensate thus supplied to column 10 will be recondensed by contact with the liquid in the lower portion of this zone and the temperature of the latter will be increased sufficiently, by the heat of condensation thus liberated from the vapors, to effect its reboiling and evolution of the low-boiling fractions contained therein in excess of those desired as components of the final stabilized product.

Any condensate remaining unvaporized in heat exchanger 41 may be directed with the vaporized fractions thereof to stabilizer 10 or may, when desired, be separately removed from the heat exchanger and blended, for example, with the stabilized and reboiled distillate previously withdrawn from vaporizer 16, by well known means not illustrated.

As applied to the stabilization of materials within the boiling range of gasoline resulting from the cracking operation and containing an appreciable quantity of normally gaseous materials, the range of operation conditions suitable for conducting the process of the invention in an apparatus such as illustrated in Fig. 1 and above described, will be approximately as follows:

The distillate to be stabilized is preferably supplied to the stabilizing column at the temperature of the order of 150 to 250° F. and the pressure employed in this zone may range for example from 125 to 200 pounds per square inch, superatmospheric. A temperature of the order of 110 to 150° F. may be maintained in the upper portion of the stabilizer adjacent the point of removal of the liberated gases and the temperature of the distillate undergoing reboiling in the lower portion of the stabilizer may range, for example, from 250 to 300° F. Under these conditions and with a pressure in the vaporizer of the order of 20 to 40 pounds per square inch, superatmospheric, sufficient exhaust steam may be passed in indirect heat exchange with the unvaporized distillate in the latter zone to maintain the same at approximately 200 to 240° F. The vapors evolved in the vaporizing chamber are preferably subjected to condensation at substantially the same pressure as that employed in the vaporizer, and, under such conditions, water at a temperature of from 70 to 90° F. or thereabouts, will effect the desired condensation. The condensate from the accumulator may be reheated by indirect heat exchange with exhaust steam, and at substantially the same or slightly higher pressure than that employed in the stabilizing column, to a sufficiently high temperature to effect its substantial vaporization and to induce reboiling of the distillate in column 10 by directly commingling the reheated and partially vaporized condensate with said distillate and by the resultant partial condensation of the vapors.

Figure 2:
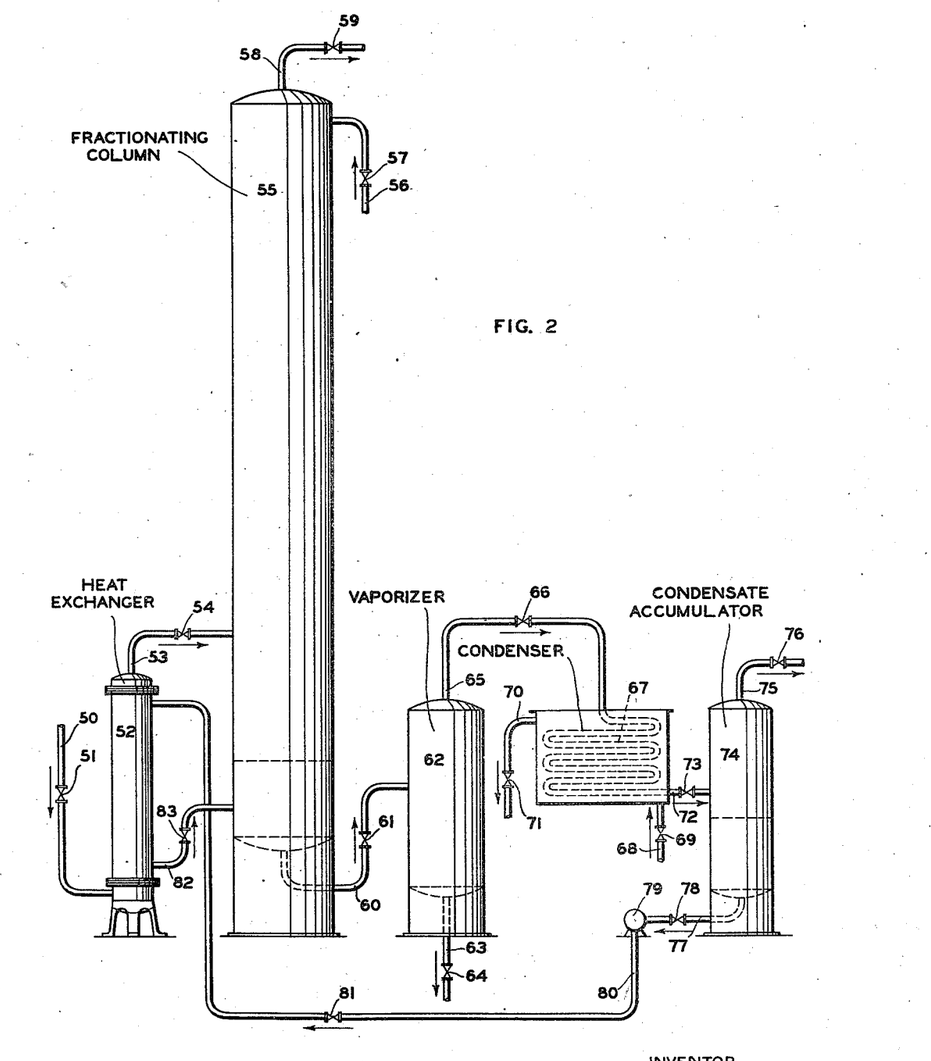
Fig. 2 illustrates an apparatus embodying the features of the invention wherein a heated mixture of vaporous hydrocarbons is fractionated to separate the desired low-boiling components of the mixture, such as gasoline for example, from its high-boiling components.

Referring now to Fig. 2, a mixture of hot vaporous and gaseous products, such as those resulting from a hydrocarbon oil cracking operation, are supplied from a pressure zone of the cracking system (not shown) through line 50 and valve 51 to heat exchanger 52 wherein they are partially cooled by indirect heat exchange with condensate from accumulator 74, as will be later described, and are thence directed through line 53 and valve 54 to fractionating column 55, or the heated vapors may, when desired, be supplied directly to fractionator 55 without passing through heat exchanger 52, by well known means not illustrated.

Separation of the desired relatively low-boiling components of the vapors from their high-boiling fractions is effected in column 55 by means of suitable fractionating means, not illustrated, such as bubble trays, packing or the like disposed in this zone and, preferably, in order to assist fractionation and maintain the desired vapor outlet temperature from the upper portion of the fractionator, a suitable cooling and refluxing medium is supplied thereto through line 56 and valve 57.

Fractionated vaporous products of the desired end-boiling point are directed from the upper portion of column 55 through line 58 and valve 59 to suitable condensing and collecting equipment, not illustrated, or to any other desired further treatment and, when desired, regulated quantities of the resulting distillate may be returned as the aforementioned cooling and refluxing medium to the upper portion of the fractionator.

Reflux condensate resulting from fractionation of the vapors in column 55 is allowed to accumulate within the lower portion of this zone and under ordinary operating conditions will contain an appreciable quantity of entrained low-boiling fractions within the range of the desired overhead distillate product. The entrainment of such low-boiling materials of the reflux condensate is particularly pronounced when, as is usually the case, the fractionating column is operated at a substantial superatmospheric pressure. Ordinarily the latent heat contained in the reflux condensate due to the superatmospheric pressure utilized in the fractionating zone is more than sufficient to effect vaporization of its components boiling within the range of the desired overhead product upon substantial reduction or release of said pressure. It is therefore difficult to control vaporization of the reflux condensate to the desired degree in a reduced pressure zone and hence further fractionation of the evolved vapors, either by returning the same to the main fractionating column or in a separate low-pressure fractionating zone communicating with the vaporizing zone, is necessitated. Furthermore, this practice results in excessive cooling of the reflux condensate, inasmuch as this material, in most modern cracking systems is returned to the heating coil for further cracking and any unnecessary reduction in the temperature of the reflux condensate requires an equivalent amount of additional reheating. Obviously, in order to effect reboiling of the reflux condensate in fractionator 55, or in a separate zone operated at the same pressure, by conventional method, a high temperature heating medium is required.

In order to obviate the disadvantages above mentioned, which are encountered when the reflux condensate is reboiled by simple flash distillation, and to obviate the use of a high temperature heating medium for reboiling, the present invention provides for substantially freeing the reflux condensate of excessively low-boiling components, including materials within the boiling range of the final light distillate products of the process and entrained or dissolved gases, by reboiling the same in fractionating column 55 at the pressure employed in this zone using the vaporous products being supplied to the fractionator as a source of heat which is supplied to the heat carrying medium at a relatively low temperature level and subsequently liberated therefrom at a higher temperature level. This is accomplished in the case here illustrated by the following steps:

The reflux condensate substantially freed of excessively low-boiling fractions in column 55, as will be later explained, is directed therefrom through line 60 and valve 61 to vaporizer 62 which is preferably operated at a substantially reduced pressure relative to that employed in column 55. The reduction in pressure in vaporizer 62 serves to effect distillation of remaining relatively low-boiling components of the reflux condensate by the latent heat liberated and ordinarily no additional heating will be required in vaporizer 62, although it is entirely within the scope of the invention to supply additional heat to this zone, when desired, by any well known means, not illustrated. The remaining unvaporized components of the reflux condensate are removed from the lower portion of vaporizer 62 through line 63 and valve 64 and may be directed through a suitable cooler, not illustrated, to storage or returned to a cracking coil of the system or otherwise disposed of in any well known manner, not illustrated.

The low-boiling fractions of the reflux condensate vaporized in vaporizer 62 are directed from the upper portion of this zone through line 65 and valve 66 to a suitable condenser 67, wherein they pass in indirect heat exchange with a suitable cooling medium, which is supplied to this zone through line 68 and valve 69 and removed therefrom through line 70 and valve 71. The resulting condensate and any uncondensed materials are directed from condenser 67 through line 72 and valve 73 to accumulator 74 wherefrom any uncondensed fractions are removed through line 75 and valve 76 to further condensation and collection or elsewhere as desired.

The relatively low-boiling condensate which collects in accumulator 74 is directed therefrom through line 77 and valve 78 to pump 79 wherefrom it is fed through line 80 and valve 81 to heat exchanger 52 and passes through this zone in indirect heat exchange with the hot vaporous products being supplied to the fractionator whereby the condensate is substantially revaporized. It is, of course, entirely within the scope of the invention to reheat and substantially revaporize the condensate recovered from accumulator 74 in any well known manner, not illustrated, but use of the method illustrated in the drawings results in a self-contained system and is preferred in most cases.

The reheated and at least partially vaporized condensate is directed from heat exchanger 52 through line 82 and valve 83 into the lower portion of fractionating column 55 wherein it is intimately contacted with the reflux condensate and partially condensed, the thus liberated heat of condensation serving to increase the temperature of the reflux condensate and effect evolution of the desired low-boiling fractions.

As applied to the fractionation of hot vaporous products from a cracking operation for the recovery of substantially all of their components boiling within the range of gasoline, the operating conditions which may be employed to accomplish the objects of the present invention, in an apparatus such as illustrated in Fig. 2 and above described, may be approximately as follows:

The vaporous conversion products are supplied to a suitable heat exchanger at a temperature which may range for example from 750 to 850° F. and are cooled in this zone to the temperature of the order of 600 to 700° F. and thence supplied to the fractionating column which may be operated at a super-atmospheric pressure of the order of 50 to 200 pounds per square inch. A temperature of the order of 375 to 450° F. may be maintained in the upper portion of the fractionating column in order to obtain a final motor fuel product having an end-boiling point of from 370 to 430° F., or thereabouts, and the temperature of the reflux condensate undergoing reboiling in the lower portion of the fractionator may range, for example, from 650 to 700° F. Under such conditions the pressure employed in the vaporizer to which the reboiled reflux condensate is supplied may range, for example, from substantially atmospheric to 50 pounds per square inch, superatmospheric, and at a pressure within substantially this range, the evolved vapors can be sufficiently condensed by indirect heat exchange with water at a normal atmospheric temperature of from 70 to 90° F. Preferably, the temperature of the condensate resulting from such cooling is within approximately 300 to 500° F. of the temperature of the cooling medium and is reheated to a temperature of the order of 600 to 750° F. and thereby at least partially revaporized, preferably by passing the same in indirect heat exchange with the hot vaporous products being supplied to the fractionator. The reheated and totally or partially revaporized relatively low-boiling condensate is directly commingled in the lower portion of the fractionator either with the body of reflux condensate accumulated in this zone or with the stream of reflux condensate descending through the lower portion of the fractionator, whereby the latter is heated, in part, by the latent heat of condensation of at least a portion of said low-boiling vapors, to a sufficiently high temperature, of the order above mentioned, to effect removal therefrom of substantially all of its components boiling within the range of the overhead distillate product, as well as any entrained and dissolved gases.

Figure 3:
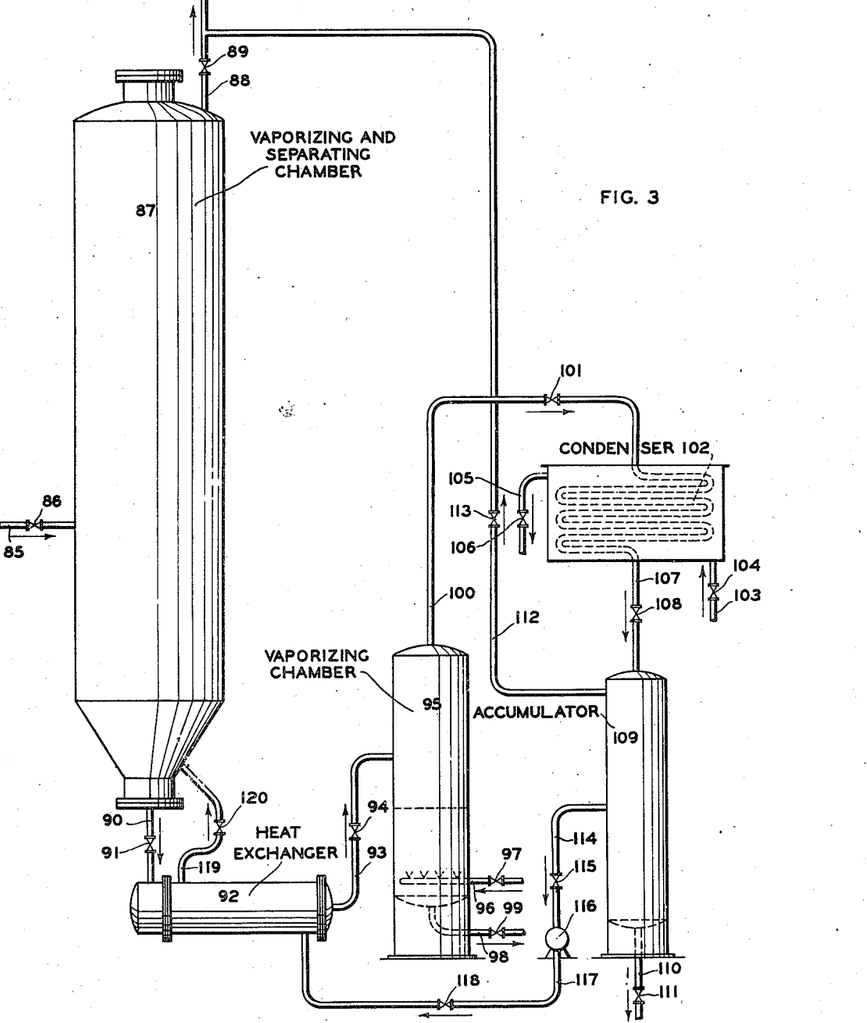
Fig. 3 illustrates an apparatus embodying features of the invention wherein hot, relatively heavy liquid hydrocarbons, such as for example, residual liquid resulting from the pyrolytic conversion of hydrocarbon oil at substantial superatmospheric pressure, is flash distilled at substantially reduced pressure to reduce its volatile content and flash point and increase its viscosity.

Referring now to Fig. 3, a mixture of hot vaporous and liquid hydrocarbon products resulting from pyrolytic conversion of hydrocarbon oil is supplied from one or more heating coils or from a relatively high pressure reaction chamber of the cracking system through line 85 and valve 86 into vaporizing and separating chamber 87, which in the present instance is preferably operated at a substantially reduced pressure relative to that employed in the preceding reaction chamber or in the cracking coil. Preferably, however, the reduced pressure is maintained substantially above atmospheric.

Vaporous and residual liquid conversion products are separated in chamber 87, the vaporous materials being directed from the upper portion of this zone through line 88 and valve 89 to fractionation or to any desired further treatment. The residual liquid remaining unvaporized in chamber 87 will ordinarily contain an appreciable quantity of relatively low-boiling fractions which are suitable for further cracking within the system to produce additional yields of the desired light distillate product and may also contain fractions within the boiling range of said light distillate product. The presence of such low-boiling fractions in residual liquid not only decreases the yield of the desired light distillate product in process, but in many cases is actually detrimental to the quality of the residual liquid product, particularly when the latter is utilized as fuel oil, by excessively reducing its flash and fire point. This is particularly true when separation of the vaporous and residual liquid products is accomplished at substantial superatmospheric pressure and, even when separation is accomplished at atmospheric or relatively low atmospheric pressure, an appreciable quantity of such low-boiling fractions are ordinarily entrained or dissolved in the residual liquid.

The purpose of this embodiment of the invention is to substantially free the residual liquid of relatively low-boiling fractions or entrained materials boiling within the range of the desired light distillate product, as well as fractions which are suitable for further conversion within the system to produce additional yields of the desired light distillate. In the case here illustrated, this is accomplished without substantially reducing the pressure on the residual liquid removed from chamber 87, although it is also within the scope of the invention to employ reduced pressure subsequent to chamber 87. The features of the invention are equally applicable regardless of the absolute pressure employed in chamber 87 and may therefore be utilized either in conjunction with a cracking system employing a reduced pressure vaporizing and separating chamber or in a cracking system wherein separation of the vaporous and liquid conversion products is accomplished in a high pressure reaction zone.

A relatively small body of unvaporized residual liquid is preferably maintained in the lower portion of chamber 87, from which it is continuously withdrawn through line 90 and valve 91 to heat exchanger 92, through which it passes in indirect heat exchange with condensate subsequently recovered therefrom, as will be later described, serving to reheat and effect total or partial revaporization of the condensate.

The residual liquid is directed from heat exchanger 92 through line 93 and valve 94 into vaporizing chamber 95 wherein low-boiling components thereof are vaporized by a reduction in pressure. In the case here illustrated, the partial pressure only is reduced, and steam is utilized for this purpose by introducing said steam into direct contact with the residual liquid in chamber 95 through line 96 and valve 97. When desired, additional heat may also be supplied to the system to assist the vaporization of the low-boiling components of the residual liquid, using the steam, for example, as the heat carrying agent. The remaining unvaporized liquid residue is removed from the lower portion of chamber 95 through line 98 and valve 99 to cooling and storage or elsewhere as desired.

The steam or water vapor and volatilized hydrocarbons are removed from the upper portion of chamber 95 and directed through line 100 and valve 101 to a suitable condenser 102, wherein they pass in indirect heat exchange with a suitable cooling medium which is supplied to this zone through line 103 and valve 104 and removed therefrom through line 105 and valve 106. The steam or water vapor and hydrocarbon vapors are substantially condensed in condenser 102 and are directed therefrom through line 107 and valve 108 to accumulator 109, wherein any uncondensed vapors and/or gases, the condensed hydrocarbons and water are separated.

The water is removed from the lower portion of accumulator 109 through line 110 and valve 111, while uncondensed vapors and/or gases are withdrawn from the upper portion of the accumulator and directed through line 112 and valve 113 into line 88 to commingle with the vaporous products withdrawn from chamber 87 or they may, when desired, be supplied by any well known means, not shown, directly to the same fractionator or other stage of the system, not illustrated, to which the vaporous products from chamber 87 are supplied. By employing substantially the same pressure in accumulator 109 as that utilized in chamber 87 with only a slight reduction in pressure on the vaporous products from this zone as they pass through valve 89 in line 88, the two streams of vaporous products may be commingled, as illustrated, without employing a pump or compressor and with this method of operation it is unnecessary to condense all of the vapors evolved in chamber 95 in condenser 102. Therefore water, for example, at atmospheric temperature, may be employed as the cooling medium in condenser 102.

The relatively low-boiling hydrocarbon oil fractions collected as condensate in accumulator 109 are directed from a suitable intermediate point in this zone through line 114 and valve 115 to pump 116 by means of which they are supplied through line 117 and valve 118 to heat exchange 92, passing therethrough, as previously mentioned, in indirect heat exchange with the relatively hot residual liquid from chamber 87 and being thereby reheated and at least partially revaporized.

The reheated and totally or partially vaporized low-boiling hydrocarbons are directed from heat exchanger 92 through line 119 and valve 120 into the lower portion of chamber 87, preferably beneath the level of residual liquid maintained in this zone or at least in intermediate contact with the residual liquid therein. The revaporized materials are thus partially condensed by contact with the residual liquid and the resulting heat of condensation absorbed by the residual liquid serves to effect vaporization of the low-boiling fractions which it is desired to separate therefrom.

The preferred range of operating conditions which may be employed, in an apparatus such as illustrated in Fig. 3 and above described, to accomplish this particular embodiment of the process of the invention, may be approximately as follows: With the hot conversion products supplied to the vaporizing and separating chamber 87 at a temperature of the order of 750 to 850° F. and with a superatmospheric pressure ranging, for example, from 50 to 200 pounds per square inch maintained in the vaporizing and separating chamber, the unvaporized residual liquid may be removed from this zone at a temperature of the order of 750 to 850° F. and, after passing in indirect heat exchange with the condensate, may be supplied to the subsequent vaporizing chamber at a temperature of approximately 650 to 750° F. The last mentioned vaporizing chamber is preferably maintained at substantially the same pressure as that employed in the first mentioned vaporizing and separating chamber, although any desired lower pressure down to substantially atmospheric or even sub-atmospheric pressure may be employed in this zone, when desired. With a pressure in the final vaporizing chamber substantially the same as that employed in the first mentioned vaporizing and separating chamber, steam at a temperature of approximately 350 to 500° F. will accomplish the desired degree of vaporization in this zone. The temperature to which the vaporous materials from the final vaporizing chamber are subjected to condensation, will, of course, depend to a large extent upon the temperature of the available supply of cooling medium and may range, for example, from 400 to 600° F. The pressure employed in the accumulator preferably is substantially the same as that employed in the first vaporizing and separating chamber, except when reduced pressure is employed in the second vaporizing chamber. The temperature to which it is necessary to reheat the relatively low-boiling condensate from the accumulator prior to its introduction into the initial vaporizing and separating chamber may range, for example, from 700 to 800° F., depending upon the temperature at which the residual liquid is removed from chamber 87, as well as its composition, particularly with respect to the boiling range of its low-boiling fractions which are subsequently vaporized, condensed and returned, after heat exchange with the hot residual liquid, to the initial vaporizing and separating chamber, the temperature being regulated to effect substantial vaporization of said condensate.

I claim as my invention:

1. A method of reboiling liquid of relatively wide boiling range in a zone of substantial superatmospheric pressure, to liberate the excess of low-boiling components therefrom, which comprises removing the reboiled liquid from the lower portion of said zone of substantial superatmospheric pressure in heated state and supplying the same to a zone of substantially reduced pressure wherein vaporization of its low-boiling fractions is accomplished by the liberation of latent heat, subjecting the fractions thus vaporized to condensation, recovering the resulting condensate, passing said condensate in indirect heat exchange with a heating medium of lower temperature than that required for the direct reboiling of said liquids in said zone of substantial superatmospheric pressure, whereby to revaporize at least a substantial portion of said condensate, and introducing the resultant vapors into direct contact with said liquid in the lower portion of said zone of substantial superatmospheric pressure, whereby at least a portion of said vapors are condensed and the resulting heat of condensation serves to reboil said liquid.

2. A method of reboiling liquid of relatively wide boiling range in a zone of substantial superatmospheric pressure, to liberate the excess of low-boiling components therefrom, which comprises removing the reboiled liquid from the lower portion of said zone of substantial superatmospheric pressure in heated state and introducing the same into a zone of substantially reduced pressure, wherein low-boiling fractions thereof are vaporized by the liberated latent heat and by additional heat supplied to said liquid in said reduced pressure zone by its indirect heat exchange with a heating medium of lower temperature than that required for direct reboiling of said liquid in said zone of substantial superatmospheric pressure, subjecting the evolved vapors to condensation, recovering the resulting condensate, passing said condensate in indirect heat exchange with a heating medium of lower temperature than that required for the direct reboiling of said liquids in said zone of substantial superatmospheric pressure, whereby to revaporize at least a substantial portion of said condensate, and introducing the resulting vapors into direct contact with said liquid in the lower portion of said zone of substantial superatmospheric pressure, whereby at least a portion of said vapors are condensed and the resulting heat of condensation serves to reboil said liquid.

3. In a process for the stabilization of gasoline to the desired vapor pressure wherein said gasoline is supplied in heated state to a stabilizing column, operated at substantial superatmospheric pressure, wherein its substantial vaporization is accomplished and wherein any excess quantity of normally gaseous materials are separated therefrom, the improved method of reboiling the unvaporized gasoline collecting in the lower portion of said stabilizing column which comprises removing the reboiled gasoline to a zone of substantially reduced pressure, wherein low-boiling normally liquid fractions of the gasoline are vaporized, subjecting the vapors evolved in said reduced pressure zone to condensation, passing the resulting condensate in indirect heat exchange with a heating medium of lower temperature than that required for the direct reboiling of said gasoline in said stabilizing column, whereby to reheat and at least partially revaporize said low-boiling fractions in the absence of the unvaporized higher boiling components of the gasoline, and introducing the thus reheated and revaporized materials into direct contact with said unvaporized gasoline in the lower portion of the stabilizing column, whereby at least a portion of said revaporized material is condensed and the resulting heat of condensation serves to effect said reboiling of the unvaporized gasoline.

4. A process of the character defined in claim 3 wherein the vaporization of said low-boiling fractions in said reduced pressure zone is accomplished entirely by the latent heat liberated from the gasoline by said pressure reduction.

5. A process of the character defined in claim 3 wherein said vaporization of the low-boiling normally liquid fractions of the gasoline is accomplished in said reduced pressure zone with the assistance of a low temperature heating medium, such as exhaust steam, passed in indirect heat exchange with the gasoline in said reduced pressure zone.

6. A process of the character defined in claim 3 wherein the pressure maintained in said reduced pressure zone and subsequent condensing step wherein said condensate is formed, is controlled to permit substantial condensation of the vaporized materials by indirect heat exchange between the vaporized materials and water at a temperature of the order of 70 to 90° F.

7. In a process for the fractionation of hot vaporous hydrocarbons, such as those resulting from the pyrolytic conversion of hydrocarbon oils, for the purpose of separating relatively low-boiling and high-boiling components thereof, the improved method of reboiling the reflux condensate collecting in the zone of said fractionation, to substantially free the same of undesired low-boiling components, which comprises removing said reflux condensate from the fractionating zone and subjecting the same to partial vaporization by substantially reducing the pressure thereon in a separate vaporizing zone, subjecting the low-boiling fractions of the reflux condensate thus vaporized to condensation, passing the resulting condensate in indirect heat exchange with said hot vaporous hydrocarbons being supplied to said fractionating zone, whereby to reheat said condensate sufficiently to effect its substantial revaporization, and introducing the thus reheated and revaporized condensate into direct contact with said reflux condensate adjacent the point of removal of the reflux condensate from the fractionating zone, whereby at least a portion of the revaporized materials are condensed and the heat of condensation thus liberated serves to reboil said reflux condensate.

8. A process of the character defined in claim 7 wherein a sufficient pressure is maintained in said vaporizing zone and in subsequent condensation step to which the vaporized materials are supplied to effect substantial condensation of the latter by their indirect heat exchange with water at a temperature of the order of from 70 to 90° F.

9. In a process wherein residual liquid resulting from the pyrolytic conversion of hydrocarbon oil is separated from vaporous components of the conversion products in a zone of superatmospheric pressure, the improvement which comprises substantially stripping said residual liquid of undesired low-boiling components which comprises removing the liquid residue of said zone of superatmospheric pressure in heated state, recovering heat therefrom, as subsequently described, introducing the partially cooled residual liquid into a vaporizing chamber separate from the first mentioned zone, introducing steam into direct contact with the residual liquid in said vaporizing chamber whereby to effect its partial vaporization, recovering the remaining unvaporized liquid residue, removing vaporous products evolved in said vaporizing chamber therefrom and subjecting them to condensation, collecting and separating the water resulting from condensation of the steam, the distillate resulting from condensation of the hydrocarbon vapors and any uncondensed vaporous and gaseous materials, commingling the latter with the vaporous products removed from the first mentioned zone, passing said distillate in indirect heat exchange with the hot residual liquid removed from said zone of superatmospheric pressure, whereby to reheat the distillate sufficiently to effect its substantial vaporization, and introducing the reheated and revaporized distillate into direct contact with said liquid residue prior to its removal from the first mentioned zone, whereby the revaporized materials are at least partially condensed and the resulting heat of condensation serves to substantially strip the residual liquid of said undesired low-boiling components.

10. A process of the character defined in claim 9 wherein said vaporizing chamber and the succeeding condensing and separating stages of the system are operated at a pressure substantially the same as that employed in the first mentioned zone.

CLARENCE G. GERHOLD.